(12) United States Patent
Forslund

(10) Patent No.: US 7,328,238 B2
(45) Date of Patent: Feb. 5, 2008

(54) SYSTEM AND METHOD FOR CONTROL OF WEB PAGES

(75) Inventor: Ken L. Forslund, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 10/353,562

(22) Filed: Jan. 29, 2003

(65) Prior Publication Data

US 2004/0148339 A1    Jul. 29, 2004

(51) Int. Cl.
*G06F 15/16* (2006.01)
*G06F 1/12* (2006.01)

(52) U.S. Cl. ...................... 709/203; 709/249

(58) Field of Classification Search ............. 709/203, 709/223–226, 249
See application file for complete search history.

(56) References Cited

U.S. PATENT DOCUMENTS

| | | | | | |
|---|---|---|---|---|---|
| 5,774,887 | A | * | 6/1998 | Wolff et al. ................. | 707/1 |
| 5,963,945 | A | * | 10/1999 | Pal ............................. | 707/10 |
| 6,237,035 | B1 | * | 5/2001 | Himmel et al. ............. | 709/224 |
| 6,317,760 | B1 | * | 11/2001 | Byrd et al. ................. | 715/513 |
| 6,418,141 | B1 | | 7/2002 | Votava | |
| 2002/0111968 | A1 | * | 8/2002 | Ching ......................... | 707/514 |

OTHER PUBLICATIONS

WebQuilt: A Framework for Capturing and Visualizing the Web Experience, Hong, J.I. & Landay, J.A., WWW10, May 2001, ACM 1-58113-348-0, p. 717-724.*
HTML Thin Client and Transactions, Touchette, Jean-Francois, Software Tools for the Professional Programmer, Dr. Dobb's Journal, Oct. 1999, vol. 24, issue 10, ISSN 1044-789X.*
Dynamic reference to support authoring of Web based material, Konstandinidis, V., et al. Euromicro Conf. 2002, Proceed. of the 26th Sch. of Comput. & Math. Sci., ISBN 0-7695-0780-8, p. 78-85.*
Stephen Walther; Building ASP.NET Pages, Chapter 1, pp. 17-55, ASP.NET UNLEASHED, Jun. 2001.
Stephen Walther; Building Forms with Web Server Controls, Chapter 2, pp. 131-136, ASP.NET UNLEASHED, Jun. 2001.
Stephen Walther; Separating Code from Presentation, Chapter 6, pp. 278-307, ASP.NET UNLEASHED, Jun. 2001.

* cited by examiner

*Primary Examiner*—Zarni Maung

(57) ABSTRACT

A system and method may provide interaction between a server and a client in which a submit request is received. The submit request may include a client counter. It is then determined whether the client counter matches a server counter. If the client and server counters match, then a first action is performed. Alternatively, if the client and server counters do not match, then a second action is performed. Also, a system and method is provided in which a submit request is received from a first web page. A second web page begins to be displayed and the second web page determines an identifier of the first web page. The second web page uses the identifier to determine whether the first web page has an executable code associated it. If the first web page has associated executable code, the second web page causes the executable code to be executed.

30 Claims, 3 Drawing Sheets

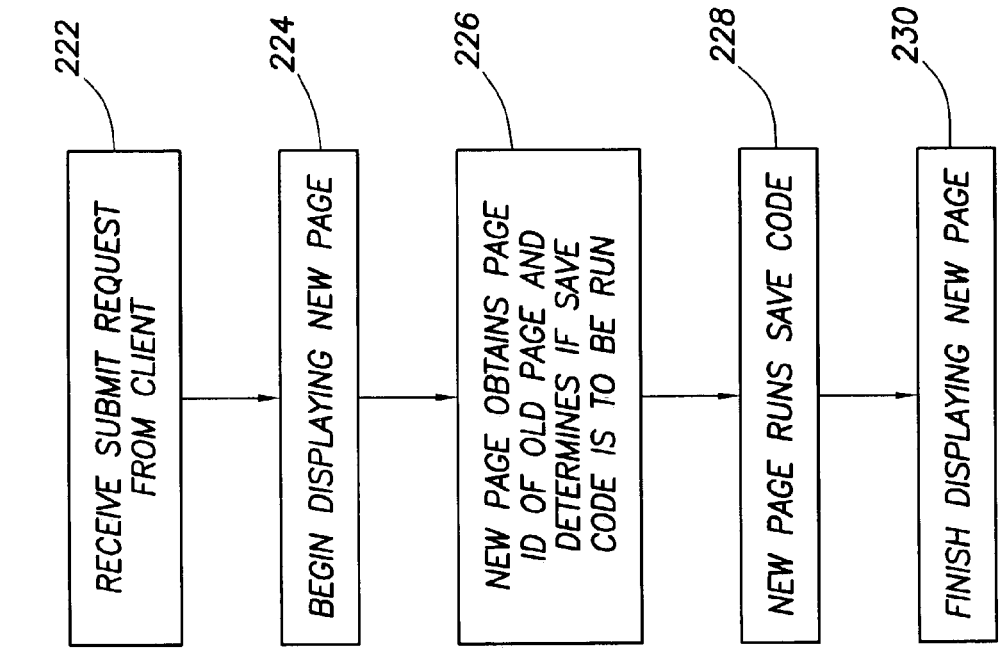
FIG.6
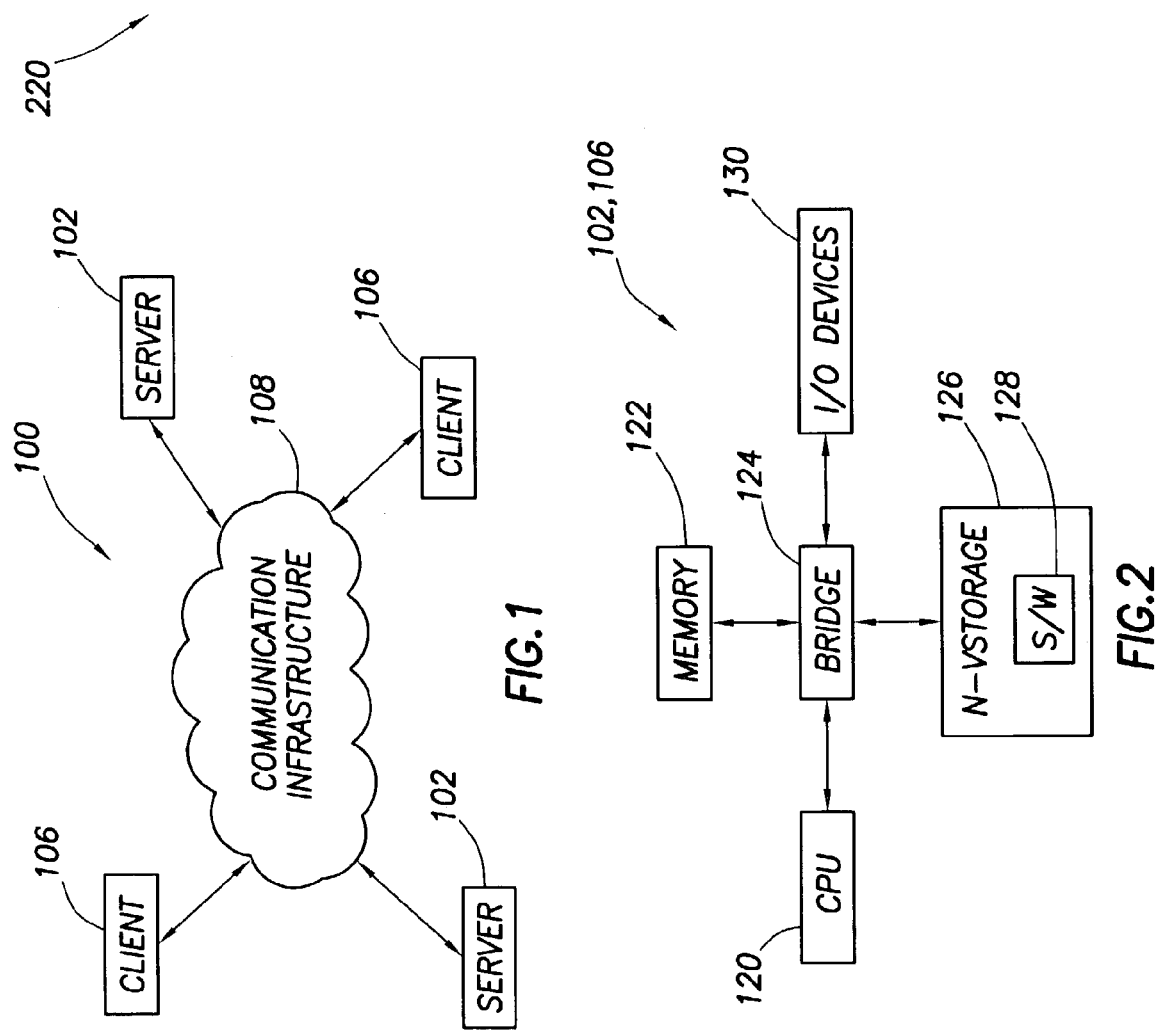
FIG.1
FIG.2

SYSTEM AND METHOD FOR CONTROL OF WEB PAGES

BACKGROUND

1. Field of the Invention

The present invention generally relates to a system and method for control of web pages.

2. Background Information

Various types of networks include at least one server and at least one client. The servers and clients may comprise various forms of computers, such as desktops, rack-mounted systems, portables, handhelds, etc. The "Internet," for example, provides a communication infrastructure between various servers and clients. The present disclosure, however, is not limited to any particular number of servers or clients, nor is it limited to the Internet context.

In the context of the Internet, servers generally provide "web pages" to clients. A client typically executes a web browser application that permits a user of the client to interact with one or more servers. Each web page may comprise a hypertext mark-up language ("HTML") code that, when executed by the browser application causes the client to display information. The user may "click" a software button on the displayed web page and/or enter information. By way of example, such information may include the user's name, address, a username, password, etc.

The delivery of web pages from the server to the client over the network infrastructure takes time. To expedite the presentation of web pages on the client computer, a caching mechanism may be employed on the client. If caching is enabled, the client may store each web page delivered from the server in storage local to the client. Such cached web pages may be stored, for example, in a directory on the client's hard disk drive. Then, when the client's browser requests a web page that happens to be cached on the client (which may occur when the user clicks on the "BACK" button on the browser graphical user interface), the client's browser may retrieve the locally cached copy of the requested page from its own storage, rather than requesting the server to provide the requested page again.

As noted above, the user may click on the "BACK" button to pull up a previous web page. A "repeat action" problem may occur when the user re-submits from the previous page. For example, a user may log on to a service hosted on a server by entering a username and password on a "log on" screen and clicking on a "submit" button (e.g., a button labeled "OK"). Clicking the "submit" button may cause the client to transmit the user's username and password to the server. The server may use that information to log the user in to the applicable service. Once logged in to the service, the server transmits the next page to the client. If, at that point, however, the user clicks the "BACK" button, the "log on" screen page will be displayed on the client computer thereby permitting the user again to log on to the same service. This may result in the user undesirably logging on to the service twice. By way of an additional example, re-submitting a data entry page (e.g., a page in which the user has entered name and address information) may cause the server to store that information twice in a server-side database, thereby unnecessarily using excessive server resources.

Another problem may also arise in which a user submits from a data entry page. The submission may cause the server to pass control to a "save" page in which the server performs an action based on the user-supplied data. The action may be, for example, to write the user-supplied data to a server database. Once this action completes, the server then may submit from the save page to a display page. This process may be undesirably time consuming.

The subject matter described below addresses any or all of the aforementioned problems.

BRIEF SUMMARY OF EMBODIMENTS OF THE INVENTION

In accordance with various embodiments of the invention, a system and method may provide interaction between a server and a client in which a submit request is received. The submit request may include a client counter. It is then determined whether the client counter matches a server counter. If the client and server counters match, then a first action is performed. Alternatively, if the client and server counters do not match, then a second action is performed.

In accordance with additional embodiments of the invention, a system and method is provided in which a submit request is received from a first web page. A second web page begins to be displayed and the second web page determines an identifier of the first web page. The second web page uses the identifier to determine whether the first web page has an executable code associated it. If the first web page has associated executable code, the second web page causes the executable code to be executed.

BRIEF DESCRIPTION OF THE DRAWINGS

For a detailed description of the preferred embodiments of the invention, reference will now be made to the accompanying drawings in which:

FIG. 1 shows a system comprising at least one server coupled to at least one client over a communications infrastructure in accordance with various embodiments of the invention;

FIG. 2 illustrates a client or server in accordance with various embodiments of the invention;

FIG. 6 shows an exemplary process of a display page using a web page identifier to determine whether an executable code associated with a previous page is to be run.

NOTATION AND NOMENCLATURE

Figure 3A:
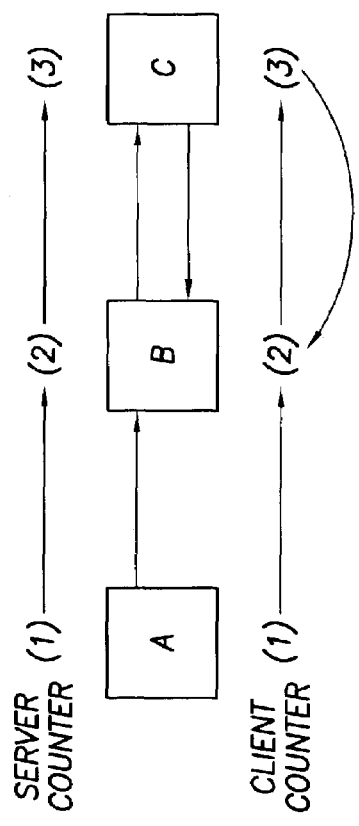
FIGS. 3a and 3b illustrate an exemplary interaction between server and client counter values and corresponding web pages.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring to FIG. 1, an electronic system 100 may include one or more servers 102 coupled to one or more clients 106 via a communication infrastructure 108. The infrastructure 108 may comprise a plurality of switches, routers, and the like. The communication infrastructure may, but not necessarily, comprise the Internet.

The servers 102 and clients 106 may comprise any of a variety of electronic devices such as rack-mounted computers, desktop computers, portable computers, handheld devices, etc. As shown in the exemplary embodiment of FIG. 2, a server 102 or client 106 may comprise a central processing unit ("CPU") 120 and memory 122 coupled to a bridge 124. The memory 122 may comprise volatile memory in which data temporarily may be stored and program code temporarily may be stored pending execution by the CPU 120. A non-volatile storage device 126 also may be included and accessed by CPU 120 via bridge 124. The storage device 126 may include software 128 which may be executable by the CPU 120 and may perform some or all of the functionality described herein. Also, one or more input/output ("I/O") devices 130 may be included, as desired. The I/O devices may include a keyboard, mouse, trackball, network interface controllers, etc. The embodiment shown in FIG. 2 may be exemplary of either a server 102 or client 106.

In accordance with some embodiments of the invention, a communication "session" may be established between a server 102 and a client 106. In general, the software 128 executed by the client's CPU 120 may comprise a browser application which requests web pages from the server 102. The server 102, running its own software 128, may retrieve and/or generate the pages requested by the client 106. In various embodiments, the server 102 and client 106 each may maintain a counter value. Each server/client may increment its counter when proceeding from one web page to the next. The increment may be performed by the server 102 independent of the client, and vice versa. As the server/client communication session proceeds forward, both entities may increment their counters by equal amounts, thereby resulting in the server's counter being synchronous with the client's counter. If, however, the user of the client's browser application clicks the "BACK" button, the client may retrieve the previous value of its counter. This act may also be implemented as a decrement of the counter value. The server's counter may not be decremented when the client's browser has its "BACK" button activated. As a result, the client's counter value will no longer match the server's corresponding counter value. When the user of the client then submits from the previous page, the client's counter value may be provided to the server. At this point, the server, aware that the server and client counters do not match, determines that the client 106 browser has been used to retrieve a previous page possibly cached in the client's storage 126. The server 102 may be programmed or configured to respond to this determination in any one of a variety of ways. Without limitation, an acceptable response may be for the server not to perform an action that the server would have performed if this was the first time the previous page was being submitted. For example, if the previous page comprises entering data to be stored in a server database, the server 102 may write the user-entered data the first time the data entry page is submitted, but not write the data to the database the subsequent time the page is submitted.

Figure 3B:
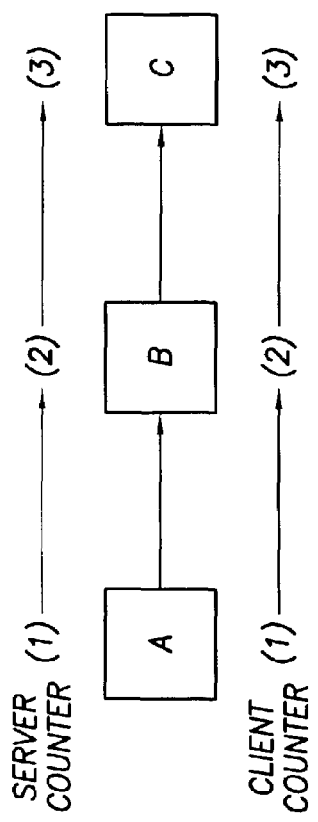

FIGS. 3a and 3b exemplify the interaction between the server and client counter values with various web pages. In the example of FIGS. 3a and 3b, web pages A, B and C are shown. As indicated by the arrows between pages A-C, pages A, B and C may be provided to the client in the order shown (i.e., page A, then B, then C). In FIG. 3a, above each page is indicated the value of the server's counter as control passes from one page to the next. As shown, the server counter begins with a value of 1, then is incremented to 2, then 3. Similarly, the client counter (shown below the web pages) also begins with a value of 1 and is incremented by the client 106 to 2 and then 3. Although in FIG. 3a the counters are incremented by a value of 1, incrementing by values other than 1 is also possible.

In FIG. 3b, after progressing to page C in which both client and server counters have been incremented to a value of 3, the "BACK" button on the client's browser may be activated to take the user back to page B. Because page B may have been cached in the client's non-volatile storage 126, page B may be retrieved by the client 106 from its own storage, rather than having the server deliver page B over the communication infrastructure 108 (FIG. 1). In accordance with various embodiments of the invention and in accordance with the example of FIGS. 3a and 3b, the server's counter may remain at 3, while the client 106 retrieves the previous value of the counter (i.e., "2") or decrements the counter. When the user again submits from page B, as explained below, the server 102 may determine that the server and client counter values are not the same and may react in a manner that is different from how the server 102 reacted the first time page B was submitted by the client 106.

Figure 4:
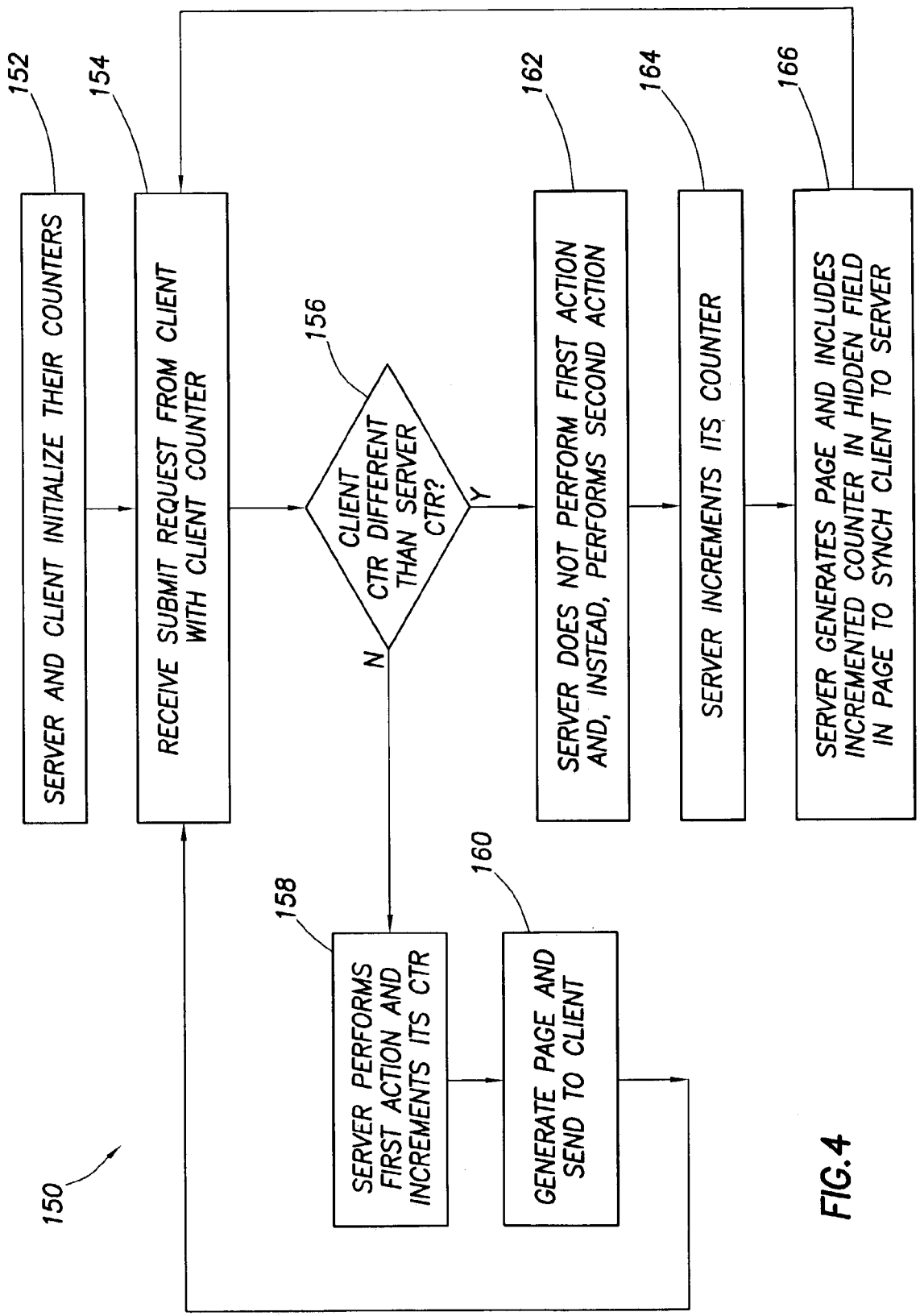
FIG. 4 shows an exemplary process in accordance with various embodiments of the invention.

FIG. 4 shows an exemplary process 150 in accordance with various embodiments of the invention. The process includes blocks 152-166. In block 152, the server 102 and client 106 may initialize their counters (e.g., to a value of 1). This counter initialization block may be performed when a session is begun between the client and server. In block 154, the server 102 may receive a submit request from the client. The submit request may be initiated by a user clicking a submit button on the client 106. The client browser may include its counter, which may have been incremented from its initial value, in the submit request packet transmitted to the server. In accordance with various embodiments, the submit packet may comprise HTML code and the client counter value may be encoded into a hidden field in the HTML code transmitted by the client.

In decision block 156, the server 102 may determine whether the client's counter value, provided via the submit request packet from the client 106, matches the server's corresponding counter value. If the counter values are the same, control passes to block 158 in which the server performs a "first" action and increments its counter. The "first" action may include any one of a variety of actions and is entirely dependent on the page that was submitted by the client 106 and received by the server 102 in block 154. In block 160, the server 102 may generate the next page to be sent to the client 106. If desired, this newly generated page may include the server's counter value in a hidden field. Control then may loop back to block 154.

If the server and client counter values do not match, as determined in decision block 156, blocks 162-166 may be performed by the server 102. In block 162, the server 102 may perform whatever action is appropriate in this situation. As noted above, this action may be simply not to perform the first action the server performs when the counters match (block 158). For example, if the "first" action is write data to a database, in block 162, the server 102 may not perform this write operation. In general, the server may perform a "second" action which may be different than the "first" action. The second action also may include not performing any action at all. In block 164, the server 102 also may increment its counter. In block 166, the server may generate the next page to be transmitted to the client. This page may include the now incremented server counter value in a hidden field. Although not necessarily the case, block 166 may be identical to block 160. By providing the server's counter value to the client, the client's counter may be synchronized with the server's counter. Thus, once the client 106 receives the new page generated in block 166, the client may extract the new server counter value and use that value as the client's new counter value. At that point, both the server and client counter values may be the same and control may loop back to block 154.

In conventional web applications, the server may run an intermediate page C between two pages A and B. That is, the client may be on page A and desire page B as the next page. The server, however, may have to run save code before providing page B to the client. For example, page A may comprise a data entry screen. Before page B can be provided to the client, the data entered by the client in page A may need to be added to a database. Accordingly, in conventional systems, the server may cause the save code to be run via intermediate page C from which the save code is run to save the data to a database. It is generally known that submitting from page A to page C takes a finite amount of time, as does submitting from page C to page B.

Figure 5:
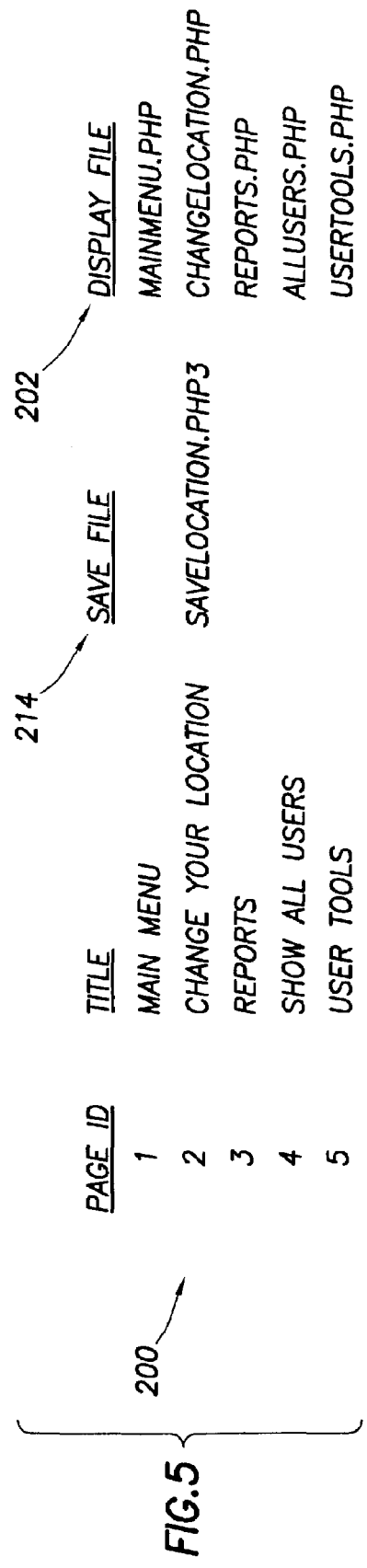
FIG. 5 provides an example of a database which includes web page identifiers and associated save code file names.

In accordance with various embodiments of the invention, the aforementioned save code may be executed without the need for the intermediate page C, thereby reducing the overall time needed to accomplish the desired tasks. In accordance with embodiments of the invention, each web page may be assigned an identifier value. FIG. 5 shows an example of a database 200 that includes five page identifiers (1-5). Database 200 may be stored on, or otherwise accessible by, the server. The five pages include a Main Menu, Change Your Location, Reports, Show All Users, and User Tools. Associated with each of the five pages is a Display File 202 that may be provided by the server to the client to display related information on the client. Further, one or more of the pages may have an associated Save File 204. For example, page identifier 2 includes a Save File called SaveLocation.php3.

Referring back to the example given above regarding pages A, B and C, in accordance with various embodiments of the invention, page A may submit to page B without first submitting to page C as was the case for conventional web applications. Page B, instead, may use page A's page ID to determine whether any save code is to be run. If save code is to be run, then such save code is run from the confines of page B. As such, only one submit (i.e., submit from page A to page B) is incurred, not two submits (A to C and then C to B) as in conventional systems. Page B may determine if save code is to be run by examining database 200 using page A's page ID. In this case, page B may determine that save code SaveLocation.php3 is to be run.

FIG. 6 shows a process 220 exemplifying the actions performed by each page. Process 220 may include blocks 222-230 and various of the actions specified in the blocks may be performed in an order other than that shown in FIG. 6 and/or concurrently with other of the blocks. In block 222, the client submits from the current page (referred to as the "old" page in FIG. 6). The new page begins to be displayed on the client in block 224. While the new page is being displayed, in block 226 the new page may obtain the page ID of the old page and, using database 200, determine whether any save code is to be run. If a save code is to be run, the new page causes such save code to be run in block 228. Finally, the displaying of the new page is completed in block 230. It should be understood that the process of FIGS. 4 and 6 may be implemented in an integrated fashion with common code.

The above discussion is meant to be illustrative of the principles and various embodiments of the present invention. Numerous variations and modifications will become apparent to those skilled in the art once the above disclosure is fully appreciated. For example, other types of code besides save code can be run by the new page in block 228 of FIG. 6. Also, information that may be relevant to this subject matter may be found in "ASP.NET UNLEASED" by Stephen Walther, June, 2001, Sams Publishing. It is intended that the following claims be interpreted to embrace all such variations and modifications.

What is claimed is:

1. A method of interaction between a server and a client, comprising:
 (a) receiving a plurality of submit requests, said submit requests each including a client counter value generated by a client counter capable of being incremented and decremented;
 (b) incrementing a server counter after receiving each of the plurality of submit requests, the server counter incremented once for each submit request received;
 (c) determining if the client counter value of a submit request of the plurality of submit requests matches the server counter;
 (d) if the client counter value of the submit request and the server counter match, then the server performing a first action; and
 (e) if the client counter value of the submit request and the server counter do not match, then the server performing a second action.

2. The method of claim 1 further comprising incrementing the server counter if the client and server counters match.

3. The method of claim 1 further comprising incrementing the server counter if the client and server counters do not match.

4. The method of claim 3 further including generating a web page which includes the incremented server counter.

5. The method of claim 4 wherein said incremented server counter is included in a hidden field in said web page.

6. The method of claim 4 wherein the client receives said server counter and resets the client counter to be equal to the incremented server counter.

7. The method of claim 1 wherein the first action comprises writing data to a storage device and the second action does not include writing data to a storage device.

8. A computer system, comprising:

a CPU;

non-volatile storage coupled to said CPU and on which software is stored, said software being executed by said CPU and said software performing a method, comprising:
- (a) receiving a plurality of submit requests, said submit requests each including a client counter value generated by a client counter capable of being incremented and decremented;
- (b) incrementing a server counter after receiving each of the plurality of submit requests, the server counter incremented once for each submit request received;
- (c) determining if the client counter value of a submit request of the plurality of submit requests matches the server counter;
- (d) if the client counter value of the submit request and the server counter match, then performing a first action; and
- (e) if the client counter value of the submit request and the server counter do not match, then performing a second action.

9. The computer system of claim 8 further comprising incrementing the server counter if the client and server counters match.

10. The computer system of claim 8 further comprising incrementing the server counter if the client and server counters do not match.

11. The computer system of claim 10 further including generating a web page which includes the incremented server counter.

12. The computer system of claim 11 wherein said incremented server counter is included in a hidden field in said web page.

13. The computer system of claim 11 wherein the client receives said server counter and resets the client counter to be equal to the incremented server counter.

14. The computer system of claim 8 wherein the first action comprises writing data to a storage device and the second action does not include writing data to a storage device.

15. A computer readable storage medium storing instructions that when executed by a computer causes the computer to manage web pages, said instructions comprising:
- (a) instructions for receiving a plurality of submit requests, said submit requests each including a client counter value generated by a client counter capable of being incremented and decremented;
- (b) instructions for incrementing a server counter after receiving each of the plurality of submit requests, the server counter incremented once for each submit request received;
- (c) instructions for determining if the client counter value of a submit request of the plurality of submit requests matches the server counter;
- (d) instructions for performing a first action if the client counter value of the submit request and the server counter match; and
- (e) instructions for performing a second action if the client counter value of the submit request and the server counter do not match.

16. The computer readable storage medium of claim 15 further comprising instructions for incrementing the server counter if the client and server counters match.

17. The computer readable storage medium of claim 15 further comprising instructions for incrementing the server counter if the client and server counters do not match.

18. The computer readable storage medium of claim 17 further including instructions for generating a web page which includes the incremented server counter.

19. The computer readable storage medium of claim 18 wherein said incremented server counter is included in a hidden field in said web page.

20. The computer readable storage medium of claim 15 wherein the first action comprises instructions for writing data to a storage device and the second action does not include instructions for writing data to a storage device.

21. A method of managing web pages, each web page including a unique identifier, comprising:
- (a) receiving a submit request from a first web page;
- (b) beginning to display a second web page;
- (c) said second web page determining an identifier of the first web page;
- (d) said second web page using said identifier to determine whether the first web page has an executable code associated with the first web page; and
- (e) if the first web page has associated executable code, said second web page causes said executable code to be executed by a computer.

22. The method of claim 21 wherein said executable code comprises save code.

23. The method of claim 21 wherein using said identifier includes examining a database containing a plurality of web page identifiers.

24. The method of claim 21 further including completing displaying the second web page.

25. A computer system, comprising:

a CPU;

non-volatile storage coupled to said CPU and on which software is stored, said software being executed by said CPU and said software performing a method, comprising:
- (a) receiving a submit request from a first web page;
- (b) beginning to display a second web page;
- (c) said second web page determining an identifier of the first web page;
- (d) said second web page using said identifier to determine whether the first web page has an executable code associated with the first web page; and
- (e) if the first web page has associated executable code, said second web page causes said executable code to be executed.

26. The computer system of claim 25 wherein said executable code comprises save code.

27. The computer system of claim 25 wherein using said identifier includes examining a database containing a plurality of web page identifiers.

28. The computer system of claim 25 further including completing displaying the second web page.

29. A computer readable storage medium storing instructions that when executed by a computer causes the computer to manage web pages, said instructions comprising:
- (a) instructions for receiving a submit request from a first web page;
- (b) instructions for beginning to display a second web page;
- (c) instructions for said second web page to determine an identifier associated with the first web page;

(d) instructions for said second web page to use said identifier to determine whether the first web page has an executable code associated with the first web page; and
(e) instructions for said second web page to cause said executable code to be executed, if the first web page has associated executable code.

30. The computer readable storage medium of claim 29 wherein the instructions to use said identifier include instructions for examining a database containing a plurality of web page identifiers.

* * * * *